United States Patent
Shin et al.

(10) Patent No.: US 10,497,167 B2
(45) Date of Patent: Dec. 3, 2019

(54) METHOD AND APPARATUS FOR GENERATING ACCELERATION STRUCTURE

(71) Applicant: SAMSUNG ELECTRONICS CO., LTD., Suwon-si, Gyeonggi-Do (KR)

(72) Inventors: Young-Sam Shin, Hwaseong-si (KR); Won-Jong Lee, Seoul (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 22 days.

(21) Appl. No.: 15/625,244

(22) Filed: Jun. 16, 2017

(65) Prior Publication Data

US 2018/0174353 A1   Jun. 21, 2018

(30) Foreign Application Priority Data

Dec. 15, 2016 (KR) .................. 10-2016-0171665

(51) Int. Cl.
*G06T 15/06* (2011.01)

(52) U.S. Cl.
CPC .................................. *G06T 15/06* (2013.01)

(58) Field of Classification Search
CPC ........................................................ G06T 15/06
See application file for complete search history.

(56) References Cited

U.S. PATENT DOCUMENTS

| | | | |
|---|---|---|---|
| 8,237,711 B2 | 8/2012 | Mccombe et al. | |
| 8,502,819 B1 * | 8/2013 | Aila | G06T 15/06 345/419 |
| 8,773,422 B1 * | 7/2014 | Garland | G06T 15/06 345/418 |
| 9,396,512 B2 | 7/2016 | Karras | |
| 9,430,863 B1 | 8/2016 | Grunschloss et al. | |
| 9,460,546 B1 * | 10/2016 | Stich | G06T 17/005 |
| 9,495,792 B2 | 11/2016 | Lee et al. | |
| 2003/0214502 A1 * | 11/2003 | Park | G06T 15/205 345/420 |
| 2012/0050289 A1 * | 3/2012 | Park | G06T 15/06 345/426 |
| 2012/0081368 A1 * | 4/2012 | Park | G06T 15/005 345/426 |
| 2013/0033507 A1 * | 2/2013 | Garanzha | G06T 15/06 345/522 |
| 2013/0235050 A1 * | 9/2013 | Karras | G06T 1/20 345/505 |

(Continued)

FOREIGN PATENT DOCUMENTS

KR   10-2015-0039496   4/2015
KR   10-2015-0057868   5/2015

(Continued)

*Primary Examiner* — Yu Chen
(74) *Attorney, Agent, or Firm* — F. Chau & Associates, LLC

(57) ABSTRACT

A method and apparatus for generating an acceleration structure. Primitives corresponding to at least one object on which rendering is to be performed may be aligned. Candidate split points are determined by scanning the aligned primitives. The candidate split points are stored according to a predetermined rule, and the acceleration structure is generated by sequentially reading the stored candidate split points and generating at least one node corresponding to the stored candidate split points.

17 Claims, 15 Drawing Sheets

(56) References Cited

U.S. PATENT DOCUMENTS

| | | | |
|---|---|---|---|
| 2014/0340412 A1 | 11/2014 | Doyle et al. | |
| 2015/0091894 A1 | 4/2015 | Shin et al. | |
| 2015/0123971 A1* | 5/2015 | Lee | G06T 15/06 |
| | | | 345/426 |
| 2015/0348307 A1 | 12/2015 | Lee et al. | |
| 2015/0348308 A1 | 12/2015 | Lee et al. | |
| 2017/0200303 A1* | 7/2017 | Havran | G06T 15/005 |
| 2018/0374257 A1* | 12/2018 | Bakalash | G06T 15/06 |

FOREIGN PATENT DOCUMENTS

| | | |
|---|---|---|
| KR | 10-2015-0136347 | 12/2015 |
| KR | 10-2015-0136348 | 12/2015 |
| KR | 10-1586145 | 1/2016 |

* cited by examiner

METHOD AND APPARATUS FOR GENERATING ACCELERATION STRUCTURE

CROSS-REFERENCE TO RELATED APPLICATION

This application claims the benefit of priority from Korean Patent Application No. 10-2016-0171665, filed on Dec. 15, 2016, in the Korean Intellectual Property Office, the disclosures of which are incorporated by reference herein.

TECHNICAL FIELD

The present disclosure relates to a method and apparatus for generating an acceleration structure.

DISCUSSION OF THE RELATED ART

Three-dimensional (3D) rendering is an image processing technique of synthesizing 3D object data as an image seen at a view point of a given camera. In 3D rendering, to more realistically express an object, a ray tracing method of determining data about the object based on a light beam from a preset light source being reflected from the object may be used.

To trace a point where scene objects, which are rendering targets, intersect with a ray, the ray tracing method may generate an acceleration structure in which the objects are spatially identified, traverse the generated acceleration structure, and check whether the ray and ray primitives intersect. Since all rays reflected from objects are traced, a lot of computation and a wide memory bandwidth are utilized in a search and an intersection check process. Accordingly, there is ongoing research into a method of generating an acceleration structure that may increase the efficiency of performing the search and the intersection check process.

SUMMARY

Provided herein are a method and apparatus for generating an acceleration structure.

In addition, a non-transitory computer readable recording medium having embodied thereon a computer program for executing the method according to the inventive concept.

Additional teachings of the inventive concept will be set forth in part in the description which follows and, in part, will be better appreciated by a person of ordinary skill in the art from the description, or may be learned by practice of the presented embodiments.

According to an embodiment of the inventive concept, a method of generating an acceleration structure for ray tracing, the method includes aligning primitives corresponding to at least one object on which rendering is to be performed; determining candidate split points by scanning the aligned primitives; storing the candidate split points according to a predetermined rule; reading the stored candidate split points and generating at least one node corresponding to one of the candidate split points; and generating the acceleration structure by using the generated at least one node.

According to an embodiment of the inventive concept, the candidate split points are stored in an internal memory of a graphics processing unit (GPU).

Determining the candidate split points may be performed by scanning the primitives in a direction in which a respective value of one of a plurality of Morton codes corresponding to each primitive increases, or decreases.

According to an embodiment of the inventive concept, the stored candidate split points are sequentially read, and sequentially generating the at least one node comprises sequentially generating an upper node and a lower node of the acceleration structure.

The reading the stored candidate split points includes candidate split points from a previous rendering.

According to an embodiment of the inventive concept, a non-transitory computer readable recording medium having embodied thereon a computer program for executing the method of generating an acceleration structure is provided.

According to an embodiment of the inventive concept, an apparatus for generating an acceleration structure includes a memory configured to store candidate split points; and a processor configured to align primitives corresponding to at least one object on which rendering is to be performed, determine the candidate split points by scanning the aligned primitives, control the memory to store the candidate split points according to a predetermined rule, and generate the acceleration structure based on a sequential reading of the candidate split points from the memory and generate at least one node corresponding to the sequentially read candidate split points.

According to an embodiment of the inventive concept, an apparatus for generating an acceleration structure for ray tracing includes a memory configured to store a plurality of candidate split points; an acceleration structure generator connected to the memory, the acceleration structure includes at least one processor configured to align primitives corresponding to at least one object of a three-dimensional image on which rendering is to be performed, determine the candidate split points by scanning the aligned primitives, control the memory to store the candidate split points according to a predetermined rule, and read the candidate split points from the memory and generate one or more nodes corresponding to one or more candidate split points. The candidate split points used to generate the acceleration structure may have been previously stored in a rendering of another object of the three-dimensional image.

According to an embodiment of the inventive concept, the acceleration structure comprises a K-dimensional (KD) tree.

According to an embodiment of the inventive concept, the memory in which the candidate split points are stored comprises an internal memory of a graphics processing unit (GPU).

The location of each of the primitives comprises coordinate information of a center of each of the primitives in a three-dimensional space.

The stored candidate split points may be sequentially read from the memory, and the acceleration structure generates at least two nodes comprising an upper node and a lower node of the acceleration structure.

According to an embodiment of the inventive concept, the candidate split points read from memory are from a previous rendering of another object.

BRIEF DESCRIPTION OF THE DRAWINGS

The inventive concept will be more readily appreciated by a person of ordinary skill in the art from the following description, taken in conjunction with the accompanying drawings in which.

DETAILED DESCRIPTION

Figure 1:
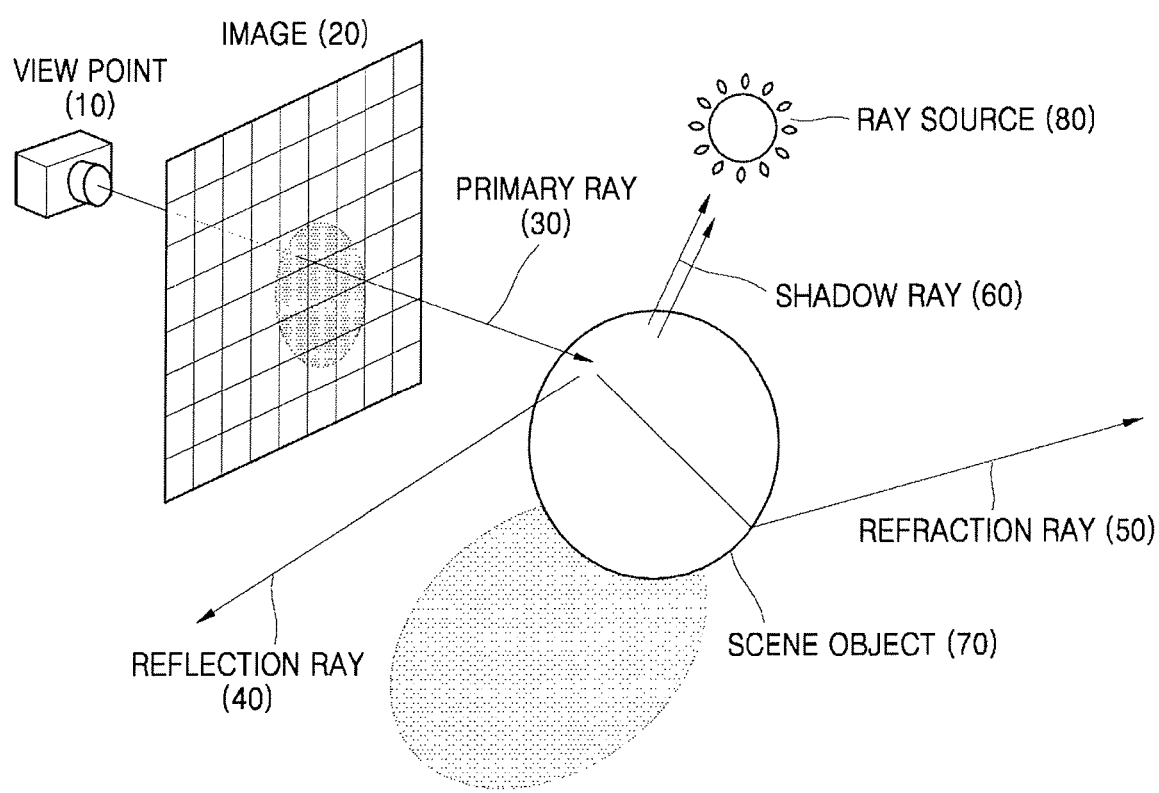
FIG. 1 is a diagram for illustrating ray tracing.

Reference will now be made in detail to embodiments, examples of which are illustrated in the accompanying drawings, wherein like reference numerals refer to like elements throughout. In this regard, the present embodiments may have different forms and the inventive concept is not to be construed as being limited to the descriptions set forth herein. Accordingly, the embodiments are described herein below with reference to the attached figures.

The terms used in the description of the inventive concept are those general terms currently widely used in the art in consideration of functions in regard to the embodiments, but the terms may vary according to the intentions of those of ordinary skill in the art, precedents, or new technology in the art. Also, in some cases, there may be terms that are optionally selected by the applicant, and the meanings thereof will be described in detail in the corresponding portions of the description of the embodiments.

Throughout the specification, when something is referred to as "including" a component, another component may be further included unless specified otherwise.

Also, as used herein, the terms "units" and "modules" may refer to units that perform at least one function or operation, and the units may be implemented as hardware or software or a combination of hardware and software.

In addition, the term "split point" may refer to a point at which a node included in the acceleration structure is generated. Hereinafter, one or more embodiments of the inventive concept will be described herein in detail with reference to the accompanying drawings so that those of ordinary skill in the art may easily implement the embodiments. In this regard, the embodiments may have different forms and should not be construed as being limited to the descriptions set forth herein.

FIG. 1 is a diagram illustrating ray tracing according to the inventive concept.

Referring to FIG. 1, a ray tracing core may determine a view point 10 in three-dimensional (3D) modeling and may determine an image 20 according to the view point 10. If the view point 10 and the image 20 are determined, the ray tracing core may generate rays with respect to each of pixels of the image 20 from the view point 10.

Upon describing the configurations of FIG. 1, a primary ray 30 may be generated from the view point 10. The primary ray 30 may intersect a scene object 70 across the image 20. A reflection ray 40 and a refraction ray 50 may be generated at the intersection point of the primary ray 30 and the scene object 70. A shadow ray 60 may be generated at the intersection point in a direction of a ray source 80. In this regard, the reflection, refraction, and shadow rays 40, 50, and 60 are referred to as secondary rays. The scene object 70 shown in FIG. 1 may indicate an object that is a rendering target with respect to the image 20. The scene object 70 may include a plurality of primitives.

The ray tracing core may analyze primary ray 30 and the second rays 40, 50, and 60, and rays that are derived from the second rays 40, 50, and 60. The ray tracing core may determine color values of the pixels constituting the image 20 based on an analysis result. In this regard, the ray tracing core may determine the color values of the pixels in consideration of a characteristic of the scene object 70.

Figure 2:
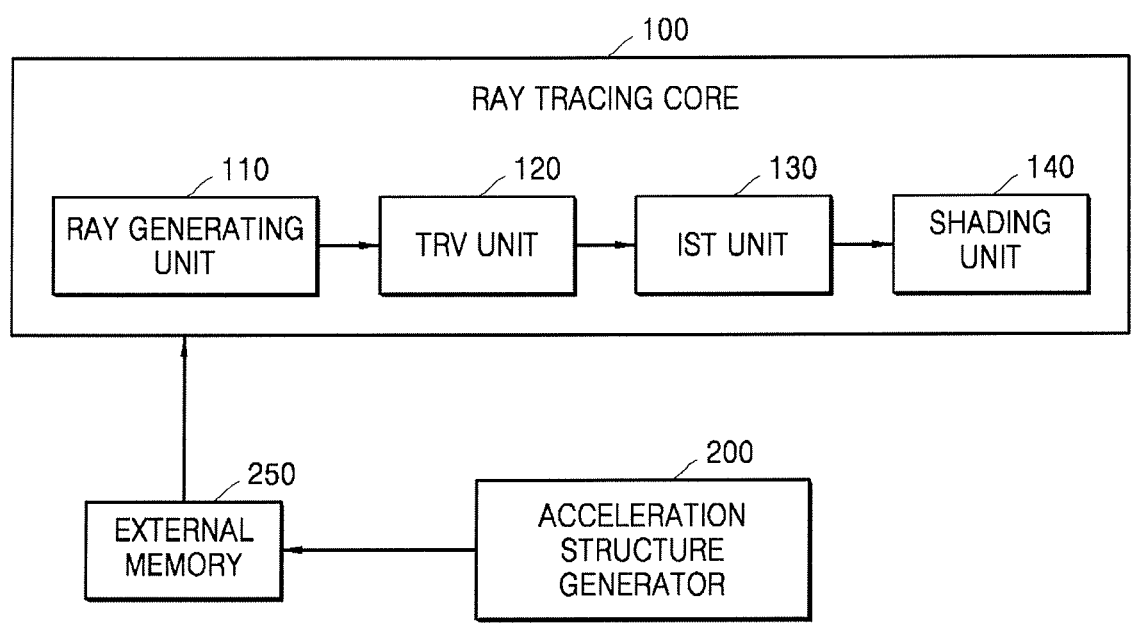
FIG. 2 is a diagram illustrating a ray tracing core, according to an embodiment of the inventive concept.

FIG. 2 is a diagram illustrating a ray tracing core 100, according to an embodiment of the inventive concept.

Referring to FIG. 2, the ray tracing core 100 may include a ray generating unit 110, a TRV unit 120, an IST unit 130, and a shading unit 140. Although the TRV unit 120 and the IST unit 130 are included in the ray tracing core 100 in FIG. 2, the TRV unit 120 and the IST unit 130 may be implemented as separate hardware. The ray tracing core 100 shown in FIG. 2 illustrates elements related to the present embodiment. Thus, it will be understood by one of ordinary skill in the art to which the present embodiment is related that other elements may be further provided in addition to the elements shown in FIG. 2.

The ray tracing core 100 may trace the intersection point of generated rays and objects located in a 3D space and may determine color values of pixels constituting an image. In other words, the ray tracing core 100 may discover the intersection point of the rays and the objects, may generate a 2D ray according to a characteristic of an object at the intersection point, and may determine a color value of the intersection point.

As a goal of using acceleration structures is to determine as quickly as possible which objects from an image that a particular ray may intersect, the ray tracing core 100 may use a previous search result and a result of a previous intersection check when traversing the acceleration structure and the intersection check. In other words, the ray tracing core 100 may utilize the results from a previous rendering process to a current rendering process to increase the performance of the current rendering process.

The ray generating unit 110 may generate a primary ray and a secondary ray. The ray generating unit 110 may generate the primary ray from a view point (e.g. shown in FIG. 1) and may generate a reflection, refraction, or a shadow secondary ray at the intersection point of the primary ray and the object. The ray generating unit 110 may generate another secondary ray at the intersection point of the secondary ray and the object. The ray generating unit 110 may generate the reflection, refraction, and shadow secondary rays executed within a determined number of times or may determine a number of times to generate the reflection, refraction, and shadow secondary rays according to the characteristic of the object.

The TRV unit 120 may receive information regarding a ray generated by the ray generating unit 110. The information regarding the generated ray may include all of the primary ray, the secondary ray, and a ray derived from the secondary ray. For example, in the case of the primary ray, the TRV unit 120 may receive information regarding a view point and a direction of the generated ray. In the case of the secondary ray, the TRV unit 120 may receive information regarding a start point and a direction of the secondary ray. The start point of the secondary ray may indicate a point hit by the primary ray. The view point or the start point may be expressed as a coordinate. The direction of the secondary ray may be expressed as a vector.

The TRV unit 120 may read information regarding the acceleration structure from an external memory 250. The acceleration structure may be generated by an acceleration structure generator 200 and may be stored in the external memory 250. The acceleration structure that may be stored in the external memory 250 may indicate a structure including location information of objects of a 3D space. The acceleration structure may be a K-dimensional (KD) tree, a bounding volume hierarchy (BVH), etc.

The TRV unit 120 may search for the acceleration structure and may output an object or a leaf node that is hit by the ray. For example, the TRV unit 120 may search for nodes included in the acceleration structure and may output to the IST unit 130 the leaf node hit by the ray from among leaf nodes that are lowest nodes. In other words, the TRV unit 120 may determine a bounding box hit by the ray from among bounding boxes constituting the acceleration structure and may determine an object hit by the ray from among objects included in the bounding box. Information regarding the object hit by the ray may be stored in a TRV cache (not shown). The bounding box may indicate a unit including a plurality of objects or primitives and may be expressed in a different form according to the acceleration structure. The TRV cache may comprise a cache memory for temporarily storing data used by the TRV unit 120 in a search process. The retrieval of information from cache regarding the object hits may reduce an overall number of calculations in comparison with a case where such information would be calculated for a current rendering.

The TRV unit 120 may search for the acceleration structure by using the result of previous renderings. The TRV unit 120 may search for the acceleration structure via the same path as that of the previous rendering by using the results of a previous rendering stored in the TRV cache. For example, when the TRV unit 120 searches for the acceleration structure with respect to an input ray, the TRV unit 120 may first search for a bounding box that was hit by a previous ray having the same view point and direction as those of the input ray. Also, the TRV unit 120 may search for the acceleration structure by referring to the search path with respect to a previous rendering.

The IST unit 130 may receive information regarding the object or the leaf node that is hit by the ray from the TRV unit 120 and such information may include read information about primitives included in the hit object from the external memory 250. The read information about primitives may be stored in an IST cache (not shown). The IST cache may comprise, for example, a cache memory for temporarily storing data used by the IST unit 130 in a search process.

The IST unit 130 may perform an intersection check between a ray and primitives and may output a primitive hit by the ray and the intersection point. The IST unit 130, which receives the object hit by the ray from the TRV unit 120, may check the primitive hit by the ray from among a plurality of primitives included in the hit object. After discovering the primitive hit by the ray, the IST unit 130 may output the intersection point indicating a point of the hit primitive and the ray intersect. The intersection point may be output to a shading unit 140 in a coordinate form.

The IST unit 130 may perform the intersection check by utilizing a result of a previous rendering. The IST unit 130 may perform the intersection check on the same primitive as performed in the previous rendering by utilizing the result of the previous rendering stored in the IST cache. For example, when the IST unit 130 performs the intersection check on the input ray and the primitive, the IST unit 130 may preferentially perform the intersection check on a primitive hit by a previous ray having the same view point and direction as those of the input ray.

With continued reference to FIG. 2, the shading unit 140 may determine a color value of a pixel based on information regarding the intersection point and a material characteristic of the intersection point from the IST unit 130. The shading unit 140 may determine the color value of the pixel in consideration of a material basis color of the intersection point and an effect arisen by the ray, etc.

The ray tracing core 100 may receive data that may be used for ray tracing from the external memory 250. Geometry data indicating information regarding the acceleration structure generated by the acceleration structure generator 200 or primitives may be stored in the external memory 250. A primitive may be a polygonal shape such as a triangular shape, a rectangular shape, etc. The geometry data may indicate information regarding apexes of primitives included in an object and locations.

The acceleration structure generator 200 may generate the acceleration structure including location information of objects on a 3D space. The acceleration structure generator 200 may generate acceleration structures of various types of shapes. For example, the acceleration structure may have a 3D space that splits into a hierarchical tree. The acceleration structure generator 200 may generate a structure indicating a relationship between the objects on the 3D space by applying the BVH or the KD-tree. The acceleration structure generator 200 may determine a maximum number of primitives of a leaf node and a tree depth and may generate the acceleration structure based on the determination.

Figure 3:
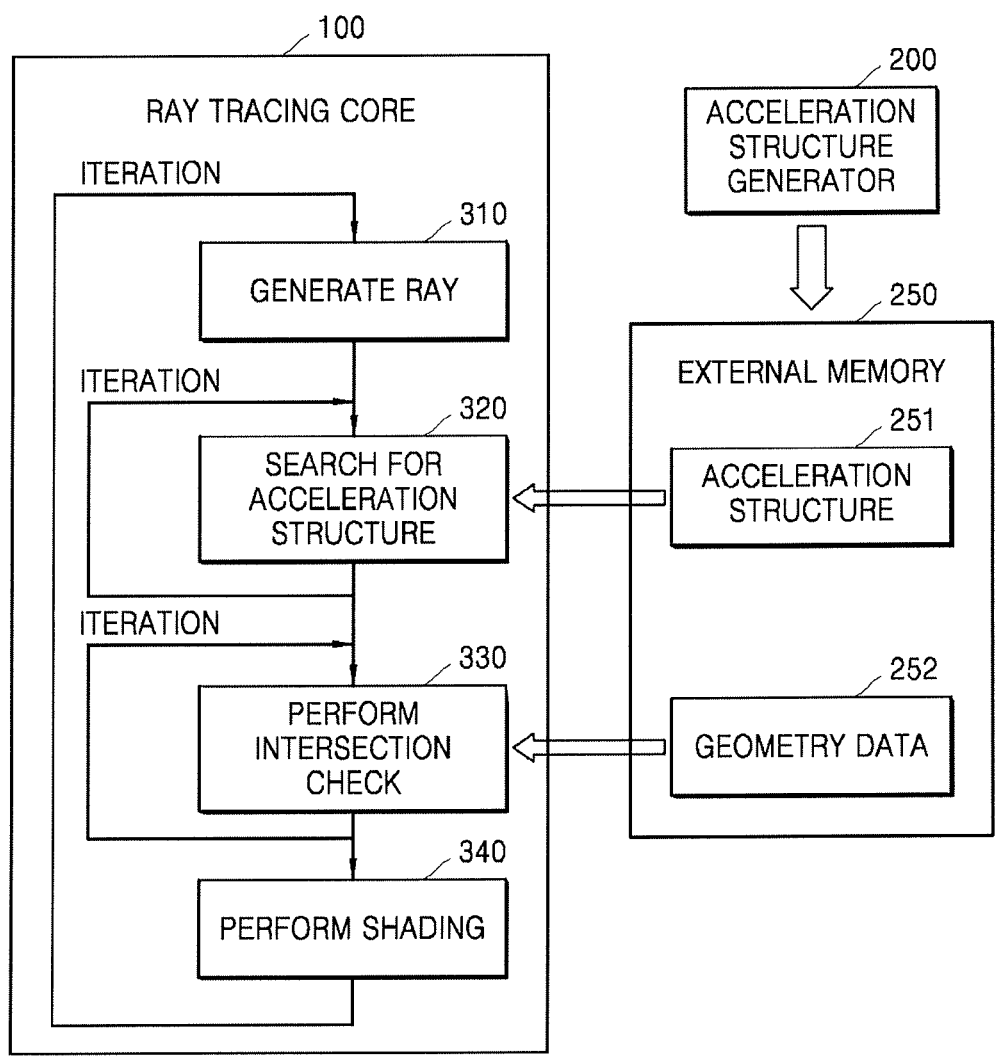
FIG. 3 is a block flow diagram illustrating an operation in which a ray tracing core performs ray tracing.

FIG. 3 is a block flow diagram that illustrates an operation in which the ray tracing core 100 performs ray tracing.

The ray tracing core 100 of FIG. 3 may have, for example, a same or a similar structure as the ray tracing core 100 shown in FIG. 2. Thus, although omitted below, descriptions of the ray tracing core 100 described above may apply to a ray tracing method of FIG. 3.

In operation S310, the ray tracing core 100 may generate a ray. The ray tracing core 100 may generate a primary ray, a secondary ray, as well as rays derived from the secondary ray.

In operation S320, the ray tracing core 100 may search the external memory 250 for an acceleration structure 251. If the external memory 250 contains the acceleration structure, this information will be read from the external memory 250. The ray tracing core 100 may search for the acceleration structure 251 based on view points and directions of the generated ray, detect a bounding box hit by the ray, and detect an object hit by the ray from among objects included in the hit bounding box. The ray tracing core 100 may repeatedly search for the acceleration structure 251 until the hit object is detected. For example, the ray tracing core 100 may search for the acceleration structure along any one path, and, if a ray does not hit a leaf node on the path of the found acceleration structure, the ray tracing core 100 may search for the acceleration structure along another path.

Although the ray tracing core 100 may sequentially search all the paths, such an operation consumes both time and resources. For example, if a graphics processing unit (GPU) sequentially searches all the paths for an acceleration structure, a great amount of computation and power may be used. According to the inventive concept, the ray tracing core 100 may preferentially search for a specific path based on search information of a previous ray. For example, when a view point and a direction of the previous ray are the same as or similar to a view point and a direction of a current ray, the ray tracing core 100 may search for a path including a leaf node hit by the previous ray.

With continued reference to FIG. 3, in operation S330, the ray tracing core 100 may perform an intersection check. The ray tracing core 100 may perform the intersection check based on geometry data 252 of primitives read from the external memory 250. The ray tracing core 100 may repeatedly perform the intersection check until a hit primitive is detected. For example, the ray tracing core 100 may perform the intersection check on any one primitive, and, if a ray does not hit the primitive, the ray tracing core 100 may perform the intersection check on another primitive, etc.

Although the ray tracing core 100 may sequentially perform the intersection check on all the primitives, the ray tracing core 100 may perform the intersection check on a specific primitive based on the intersection check information from the previous ray. For example, when the view point and the direction of the previous ray are the same as, or similar to, the view point and the direction of the current ray, the ray tracing core 100 may perform the intersection check on a primitive hit by the previous ray because there may be a greater likelihood that a primitive hit will occur by performing the intersection check.

In operation S340, the ray tracing core 100 may perform shading on a pixel based on the intersection check. If operation S340 ends, the ray tracing core 100 may perform operation S310 on another pixel constituting an image. The ray tracing core 100 may repeatedly perform operations S310 through S340 on all pixels constituting an image.

Figure 4:
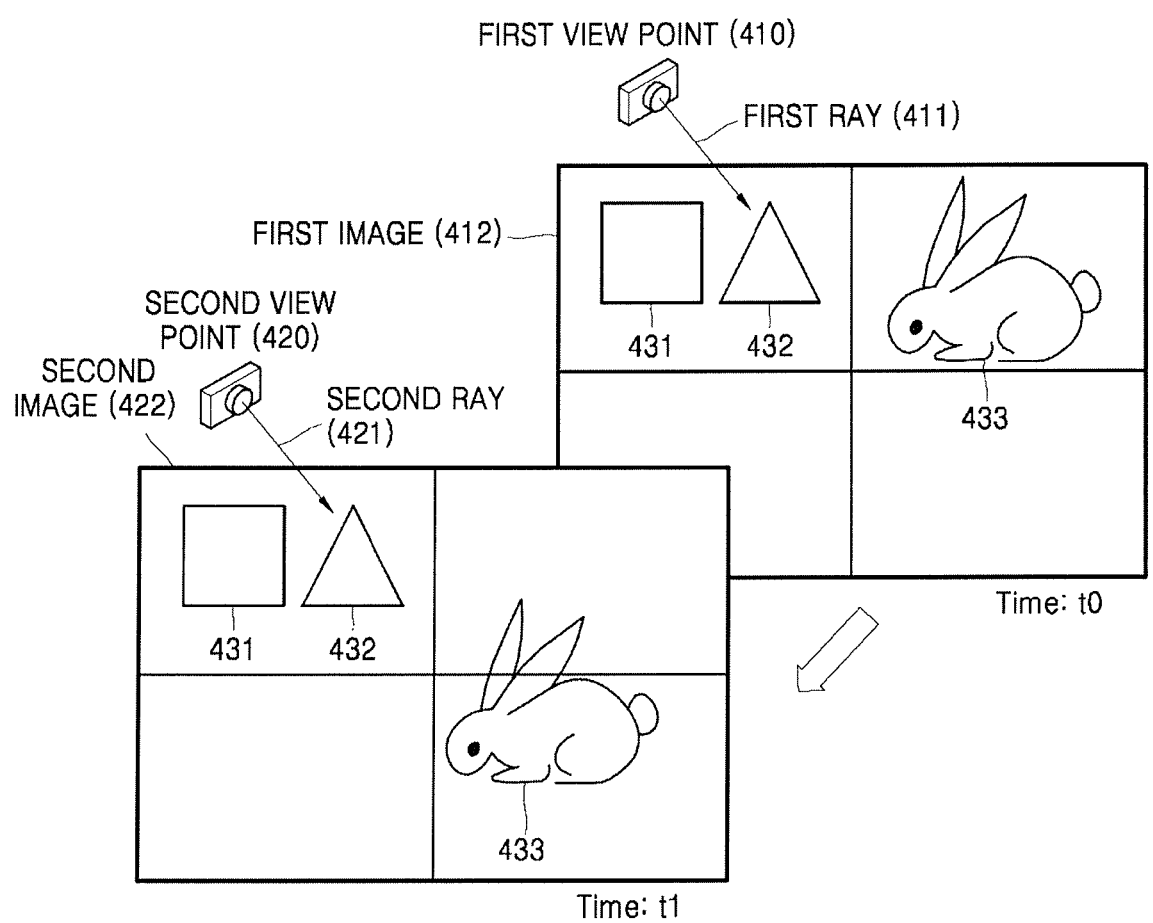
FIG. 4 is a diagram illustrating a ray tracing acceleration method.

FIG. 4 is a diagram illustrating a ray tracing acceleration method.

Referring now to FIG. 4, a first image 412 may represent an image rendered when t=0, and a second image 422 may represent an image rendered when t=1. A comparison of the first image 412 and the second image 422 shows that only a rabbit 433 moved, and a rectangle 431 and a triangle 432 did not move. Therefore, the first image 412 and the second image 422 may be almost similar. Thus, the ray tracing core 100 may perform rendering on the second image 422 by using a result of the previous rendering performed on the first image 412. For example, if a first view point 410 and a second view point 420 have the same position, and a first ray 411 and a second ray 421 have the same direction, the ray tracing core 100 may apply a result of the ray tracing on the first ray 411 to the ray tracing of the second ray 421 to accelerate the process of ray tracing of the second ray 421. For example, when the TRV unit 120 of the ray tracing core 100 searches for the second ray 421, the TRV unit 120 may preferentially search for a bounding box hit by the first ray 411. Also, when the IST unit 130 of the ray tracing core 100 performs an intersection check on the second ray 421, the IST unit 130 may perform the intersection check on the triangle 432 hit by the first ray 411. The IST unit may, for example, perform the intersection check on the triangle 432 hit by the first ray 411 because of an increased likelihood that the ray tracing of the second ray 421 can be accelerated due to a similarity of the first view point 410 and the second view point 420.

Figure 5:
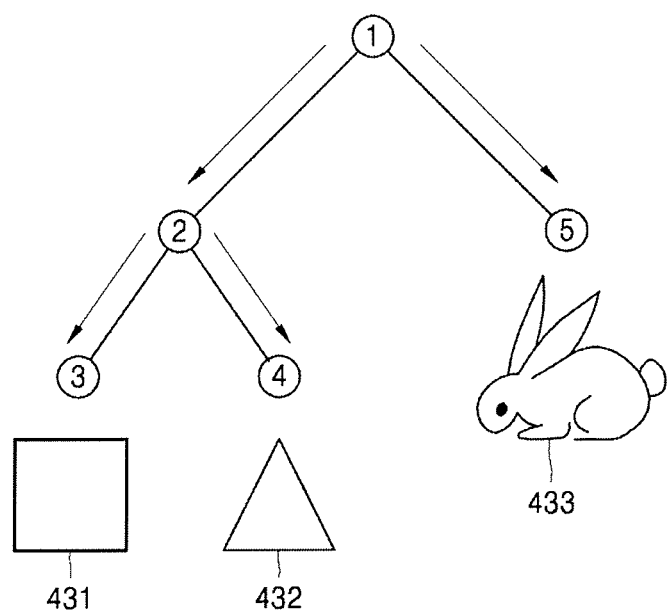
FIG. 5 is a diagram illustrating the ray tracing acceleration method of FIG. 4.

FIG. 5 is a diagram illustrating the ray tracing acceleration method of FIG. 4.

Referring to FIG. 5, the TRV unit 120 (shown in FIG. 2) may search for an acceleration structure according to three paths. First, the TRV unit 120 may search for the acceleration structure along a node 1, a node 2, and a node 3 that are first paths. Second, the TRV unit 120 may search for the acceleration structure along a node 1, a node 2, and a node 4 that are second paths. Third, the TRV unit 120 may search for the acceleration structure along a node 1 and a node 5 that are third paths. In this regard, when the TRV unit 120 searches for the second ray 421, the TRV unit 120 may preferentially search for the second path along which the triangle 432 hit by the first ray 411 is searched for. Thus, the TRV unit 120 may omit a process of searching for the first path or the second path.

Figure 6:
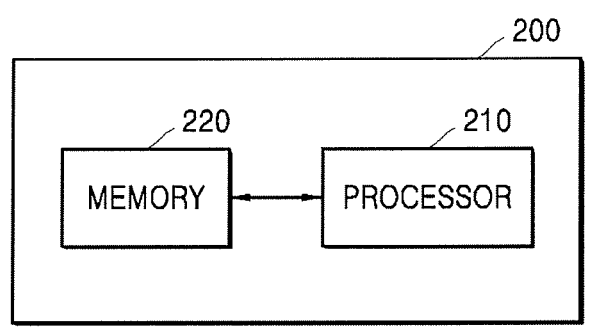
FIG. 6 is a block diagram of a ray structure generating apparatus, according to an embodiment of the inventive concept.

FIG. 6 is a block diagram of an example of the ray structure generating apparatus 200, according to an embodiment of the inventive concept.

Referring to FIG. 6, the ray structure generating apparatus 200 includes hardware, for example, a processor 210 and a memory 220, and may include software. The ray structure generating apparatus 200 may be, for example, a graphics processing unit (GPU), but is not limited thereto. Also, the memory 220 may store information about an acceleration structure. In this regard, the information about the acceleration structure may include information about a 3D space indicated by the acceleration structure. For example, the memory 220 may be a cache memory but the inventive concept is not limited thereto.

The ray structure generating apparatus 200 of FIG. 6 illustrates certain elements related to the present embodiment. Thus, it will be understood by one of ordinary skill in the art that additional general purpose constitutional elements may be further provided along with the elements shown in FIG. 6.

In general, whenever each of split points in the acceleration structure is determined, a process of scanning all primitives may be repeatedly performed. Thus, as the number of primitives used in ray tracing, or the number of the split points in the acceleration structure, increases, there may be a relatively large number of computations performed to generate the acceleration structure. The relatively large number of computations may increase an amount of power consumption by the ray structure generating apparatus.

The acceleration structure generator 200 according to an embodiment of the inventive concept may generate the acceleration structure by using previously-stored candidate split points. The previously-stored candidate split points may be from another object viewed at a same or similar view point. More specifically, the acceleration structure generator 200 may align primitives corresponding to at least one object, determine candidate split points by using the aligned primitives, and generate the acceleration structure by using the candidate split points. Thus, computation time and power consumption used by the acceleration structure generator 200 to generate the acceleration structure may be reduced.

In this regard, a split point may refer to a point at which a node included in the acceleration structure is generated. Thus, the node may include information about primitive(s) (e.g., primitive(s) included in a bounding box) is grouped with respect to the split point. For example, the node may be configured as a material structure such as a structure, a union, a class, etc. but is not limited to these examples.

Examples of a method of generating an acceleration structure performed by the acceleration structure generator 200 will now be described with reference to FIGS. 7 through 15 below. Thus, although omitted below, the descriptions of the acceleration structure generator 200 described above may apply to a method of generating an acceleration structure of FIGS. 7 through 15.

Figure 7:
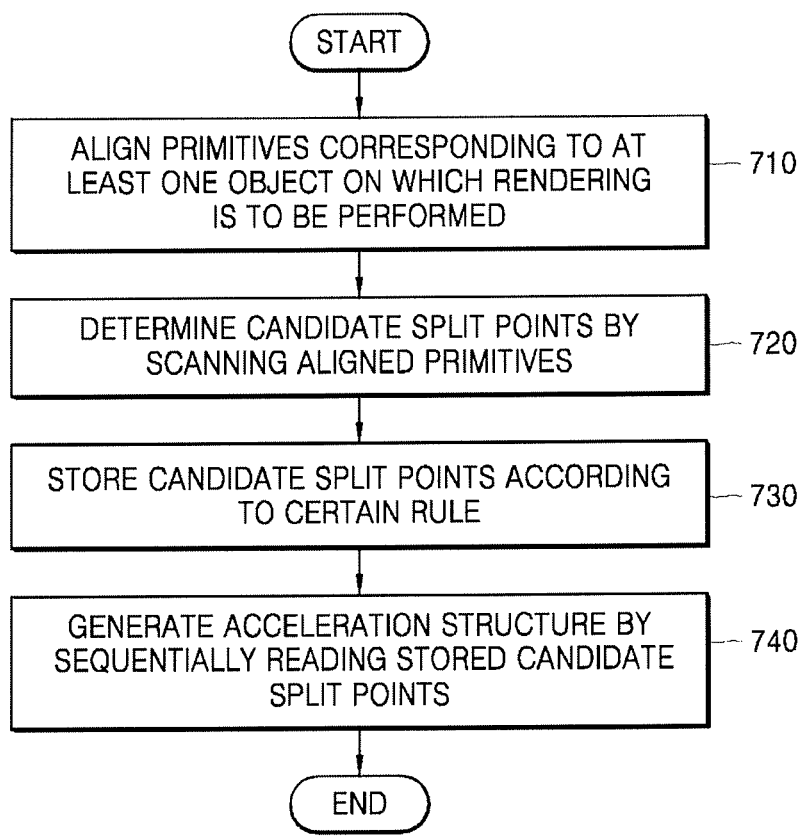
FIG. 7 is a flowchart of a method of generating an acceleration structure, according to an embodiment of the inventive concept.

FIG. 7 is a flowchart that illustrates a method of generating an acceleration structure, according to an embodiment of the inventive concept.

In operation 710, the processor 210 may align primitives corresponding to at least one object on which rendering is to be performed. Herein below is an explanation of how the processor may align primitives corresponding the at least one object.

The processor 210, for example, may generate a Morton code indicating a location of each of the primitives. In this regard, a location of a primitive may refer to a location of a center of the primitive in a 3D space. For example, the processor 210 may obtain information about a location of each of a plurality of primitives in the 3D space. For example, the information about the location may include a coordinate of a center point of each of the plurality of primitives. As another example, the information about the location may include a coordinate of a center point of a grid including each of the plurality of primitives.

Thereafter, the processor 210 may generate Morton codes indicating an x-axis coordinate, a y-axis coordinate, and a z-axis coordinate of a center point of the primitive in the 3D space. For example, the acceleration structure generator 200 may generate the Morton codes by combining one or more binary bits included in a binary number indicating the x-axis coordinate, one or more binary bits included in a binary number indicating the y-axis coordinate, and one or more binary bits included in a binary number indicating the x-axis coordinate according to a preset sequence.

Thereafter, the processor 210 may align the primitives based on the Morton codes. For example, the processor 210 may align the primitives in a direction in which values of the Morton codes increase. In other words, the processor 210 may align the primitives such that a primitive having a smaller value Morton code is disposed prior to a primitive having a greater value Morton code according to a size of the values of the generated Morton codes. A person of ordinary skill in the art should appreciate that the alignment of primitives may be based on other criteria, including but not limited to a direction of Morton codes that decrease.

An example in which the processor 210 generates Morton codes of primitives and aligns the primitives based on the Morton codes will now be described with reference to FIGS. 8 and 9.

Figure 8:
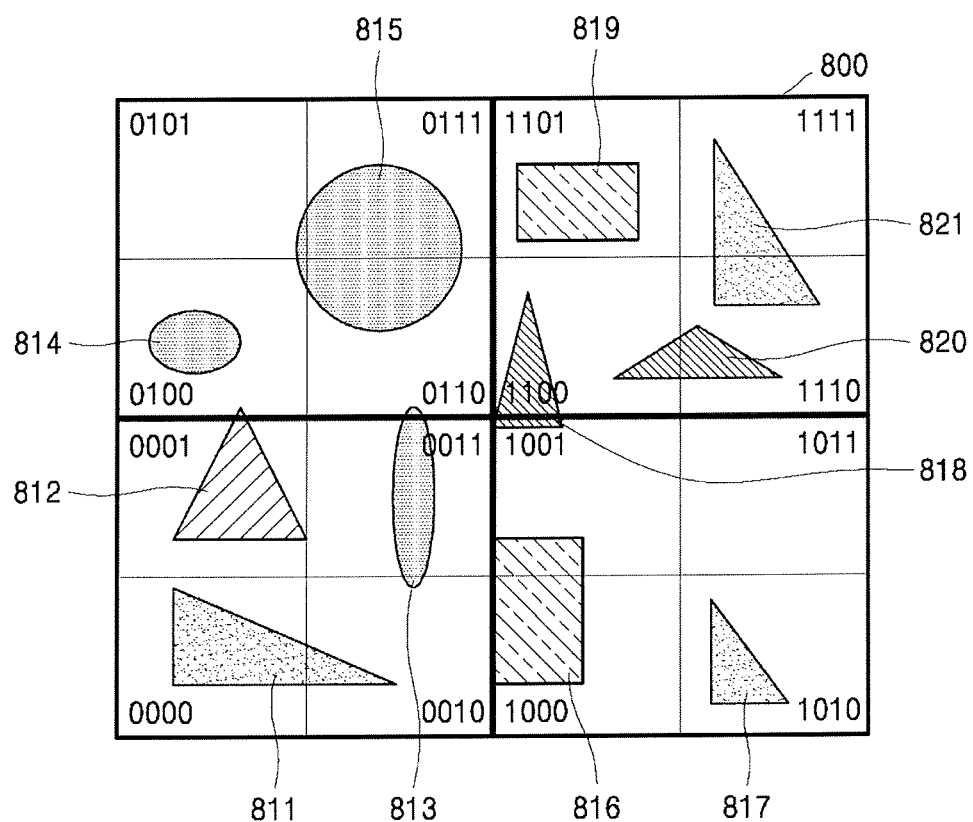
FIG. 8 is a diagram illustrating an example in which a processor generates Morton codes, according to an embodiment of the inventive concept.

FIG. 8 is a diagram illustrating an example in which the processor 210 generates Morton codes, according to an embodiment of the inventive concept.

For convenience of description, a 3D space 800 may be simplified 2-dimensionally in FIG. 8.

Referring to FIG. 8, the processor 210 may linearly represent locations of primitives 811 through 821 included in the 3D space 800 by using Morton codes.

For example, the processor 210 may equally split each of an x-axis and a y-axis of the 3D space 800 into 4 portions. The processor 210 may further split the four portions of the 3D space 800 into 16 grids. Also, the processor 210 may generate a coordinate for each of the 16 grids by allocating a 2-binary bit to a grid of each of the x-axis and the y-axis. For example, the processor 210 may respectively allocate coordinates of 00, 01, 10, and 11 to 4 grids of the x-axis and respectively allocate coordinates of 00, 01, 10, and 11 to 4 grids of the y-axis. Each of the 16 grids shown has a four-bit coordinate, ranging from 0000 to 1111 in this example.

For example, the processor 210 may represent the locations of the primitives 811 through 821 (there are 11 primitives in this example) by using coordinates of grids including the primitives 811 through 821. As another example, the processor 210 may represent the locations of the primitives 811 through 821 by using coordinates of grids including center points of the primitives 811 through 821. It may be assumed below that the processor 210 represents the locations of the primitives 811 through 821 by using coordinates of grids including center points of the primitives 811 through 821.

Also, the processor 210 may generate Morton codes by combining coordinate information of a grid including a primitive. For example, when an x-axis coordinate of the primitive is expressed as X1X2 and a y-axis coordinate thereof is expressed as Y1Y2, the Morton code of the primitive may be expressed as X1Y1X2Y2. In this regard, X1, X2, Y1, and Y2 may be binary bits indicating the x-axis coordinate and the y-axis coordinate in binary number values.

For example, since an x-axis coordinate of the first primitive 811 is 00 and a y-axis coordinate thereof is 00, X1=0, X2=0, Y1=0, and Y2=0. The acceleration structure generator 200 may combine 00 that is the x-axis coordinate of the first primitive 811 and 00 that is the y-axis coordinate thereof, thereby generating a Morton code of the first primitive 811 as 0000.

In addition, since an x-axis coordinate of the second primitive 812 is 00 and a y-axis coordinate thereof is 01, X1=0, X2=0, Y1=0, and Y2=1. The acceleration structure generator 200 may combine 00 that is the x-axis coordinate of the second primitive 812 and 01 that is the y-axis coordinate thereof, thereby generating a Morton code of the second primitive 812 as 0001.

According to the above-described method, the processor 210 may generate the Morton code of each of the plurality of primitives present in the 3D space 800. Accordingly, Morton codes of 0000, 0001, 0011, 0100, 0111, 1000, 1000, 1010, 1100, 1101, 1110, and 1111 may be respectively allocated to the first through eleventh primitives 811 through 821 present in the 3D space 800.

When a z-axis coordinate of the primitive is expressed as Z1Z2, the Morton code of the primitive may be expressed as X1Y1Z1X2Y2Z2 in the 3D space 800. In this regard, Z1 and Z2 may be binary bits indicating the z-axis coordinate in binary number values.

Figure 9:
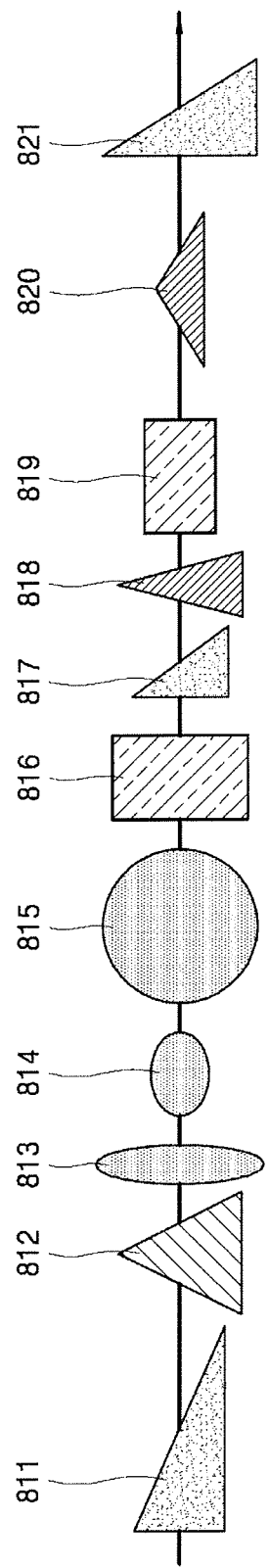
FIG. 9 is a diagram illustrating an example in which a processor aligns a plurality of primitives according to Morton codes, according to an embodiment of the inventive concept.

FIG. 9 is a diagram illustrating an example in which the processor 210 aligns the plurality of primitives 811 through 821 according to Morton codes, according to an embodiment of the inventive concept.

Referring to FIG. 9, the processor 210 may align the plurality of primitives 811 through 821 to which Morton codes are allocated. For example, the processor 210 may align the plurality of primitives 811 through 821 according to sizes of values of the Morton codes. When the processor 210, in this example, aligns primitives having small Morton code values, as shown in FIG. 9, the plurality of primitives 811 through 821 may be aligned in order of the first primitive 811, the second primitive 812, the third primitive 813, the fourth primitive 814, the fifth primitive 815, the sixth primitive 816, the seventh primitive 817, the eighth primitive 818, the ninth primitive 819, the tenth primitive 810, and the eleventh primitive 821.

Referring back to FIG. 7, in operation 720, the processor 210 may determine the candidate split points by scanning the aligned primitives. In this case, scanning may refer to a process of sequentially reviewing the aligned primitives or Morton codes corresponding to the primitives to determine the candidate split points.

A candidate split point may refer to any one of the primitives. As described with reference to FIGS. 8 and 9, the processor 210 may align the primitives according to a certain sequence. Thus, the processor 210 may be informed of a primitive of a starting view point and information about a primitive of an ending view point among the aligned primitives. The processor 210 may be informed of a sequence (e.g. an order of the aligned primitives).

Thus, when the processor 210 determines a particular primitive as being a candidate split point, the processor 210 may perform such a determination based on information about primitive(s) corresponding to a node generated according to the candidate split point. For example, assuming that the processor 210 determines the fifth primitive 815 of FIG. 9 as being the candidate split point, the processor 210 may be informed that a node generated according to the fifth primitive 815 corresponds to the first through fifth primitives 811 through 815.

For example, the processor 210 may scan primitives in a direction in which Morton codes corresponding to the primitives increase, or may scan primitives in a direction in which the Morton codes decrease. Also, the processor 210 may determine a view point at which a bit value (for example, a bit value of a first digit) of a predetermined digit of a Morton code is changed as the candidate split point.

As another example, the processor 210 may generate bounding boxes by sequentially inputting primitives and determine a view point based on a highest size increase ratio of the bonding boxes as a candidate split point.

Referring again to FIG. 7, in operation 730, the processor 210 may store the candidate split points according to a certain rule. In other words, the processor 210 may control the memory 220 to store the candidate split points according to the certain rule.

For example, the processor 210 may control the memory 220 to store the candidate split points aligned based on the Morton codes, or based on size increase rates of the bounding boxes the candidate split points. For example, the processor 210 may control the memory 220 to store the Morton codes corresponding to the candidate split points aligned in a descending order. As another example, the processor 210 may control the memory 220 to store size increase ratio values of the bounding boxes corresponding to the candidate split points aligned in a descending order.

Examples in which the processor 210 determines candidate split points and controls the memory 220 to store the candidate split points according to a predetermined rule will be described with reference to FIGS. 10 through 13 below.

Figure 10:
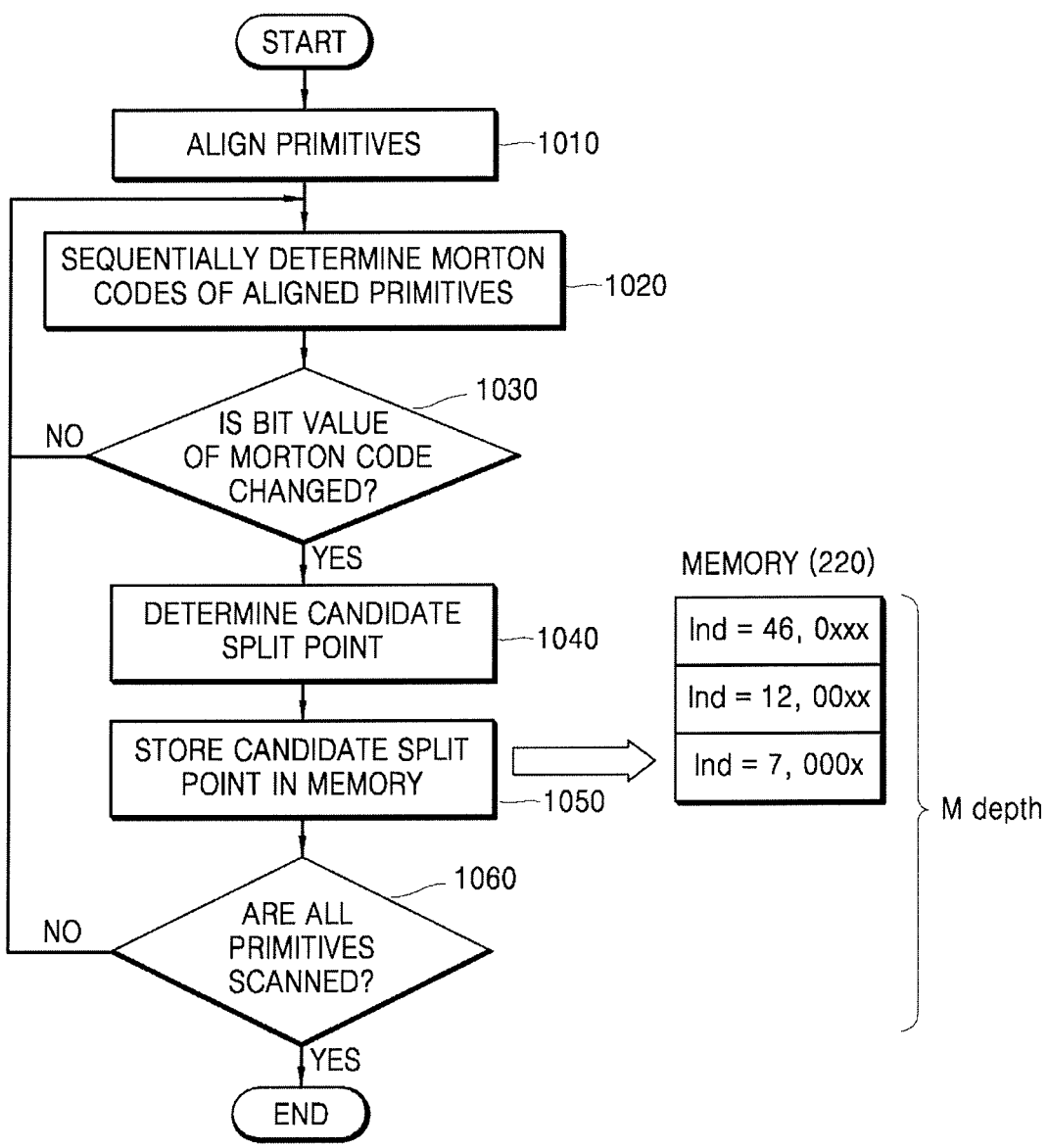
FIG. 10 is a flowchart illustrating an example in which a processor determines candidate split points and controls a memory, according to an embodiment of the inventive concept.

FIG. 10 is a flowchart illustrating an example in which the processor 210 determines candidate split points and controls the memory 220 to store candidate split points, according to an embodiment of the inventive concept.

In operation 1010, the processor 210 may align primitives. For example, the processor 210 may align the primitives based on Morton codes of the primitives. An example in which the processor 210 aligns the primitives is the same or similar to the description above with reference to FIGS. 8 and 9.

In operation 1020, the processor 210 may sequentially determine the Morton codes of the aligned primitives. For example, assuming that the primitives are aligned as shown in FIG. 9, the processor 210 may sequentially determine the Morton codes from the first primitive 811 to the last primitive 821.

In operation 1030, the processor 210 may determine if bit values of the Morton codes are changed. Specifically, the processor 210 may determine if a bit value corresponding to a predetermined digit of a Morton code is changed. For example, the processor 210 may determine if a bit value of a first digit of a Morton code is changed from '0' to '1'. However, the embodiments are not limited to the above-described example. The processor 210 may compare a current bit value of a Morton code with a previously-generated code to make such a determination regarding a change of a bit value. According to inventive concept, an example is discussed herein below regarding one way such a determination may be made. A person of ordinary skill in the art should understand and appreciate there are other ways a determination regarding how a change of bit value may be determined. Also, in operation 1030, if the processor 210 determines whether the bit value corresponding to the predetermined digit of the Morton code is changed, the processor 210 may renew a preset digit. For example, the processor 210 may renew (e.g. repeat) a first digit of the Morton code to a second digit.

If the bit value corresponding to the predetermined digit of the Morton code is changed, operation 1040 may be performed. If not, operation 1020 may be performed to determine a Morton code of a next primitive.

In operation 1050, the processor 210 may store the candidate split points in the memory 220. For example, the processor 210 may store an index of the primitives corresponding to the candidate split points and a digit having the changed bit value in the memory 220.

If there is a plurality of candidate split points, the processor 210 may align and store the candidate split points in the memory 220 to determine a sequence of reading the candidate split points in the memory 220.

For example, it may be assumed that the number of the aligned primitives is 50, a third bit value of a Morton code in a 7th primitive is changed, a second bit value of a Morton code in a $12^{th}$ primitive is changed, and a first bit value of a Morton code in a $46^{th}$ primitive is changed. In this case, the processor 210 may determine the candidate split points in a sequence of 'the 7th primitive->the $12^{th}$ primitive->the $46^{th}$ primitive'. However, the processor 210 may store the index and the digit having the changed bit value in a sequence of 'the 46th primitive->the $12^{th}$ primitive->the $7^{th}$ primitive' in the memory 220.

The processor 210 may have previously-determined a tree depth and store the candidate split points as many as a number M determined according to the tree depth in the memory 220.

In operation 1060, the processor 210 may determine whether all the primitives are scanned. In other words, the processor 210 may determine if a Morton code of a last primitive among the aligned primitives is determined. If all the primitives are scanned, a process may end. If not, operation 1020 may be performed to determine the Morton code of the next primitive.

An example in which the processor 210 determines candidate split points when a bit value of a Morton code is changed will be described with reference to FIG. 11 below.

Figure 11:
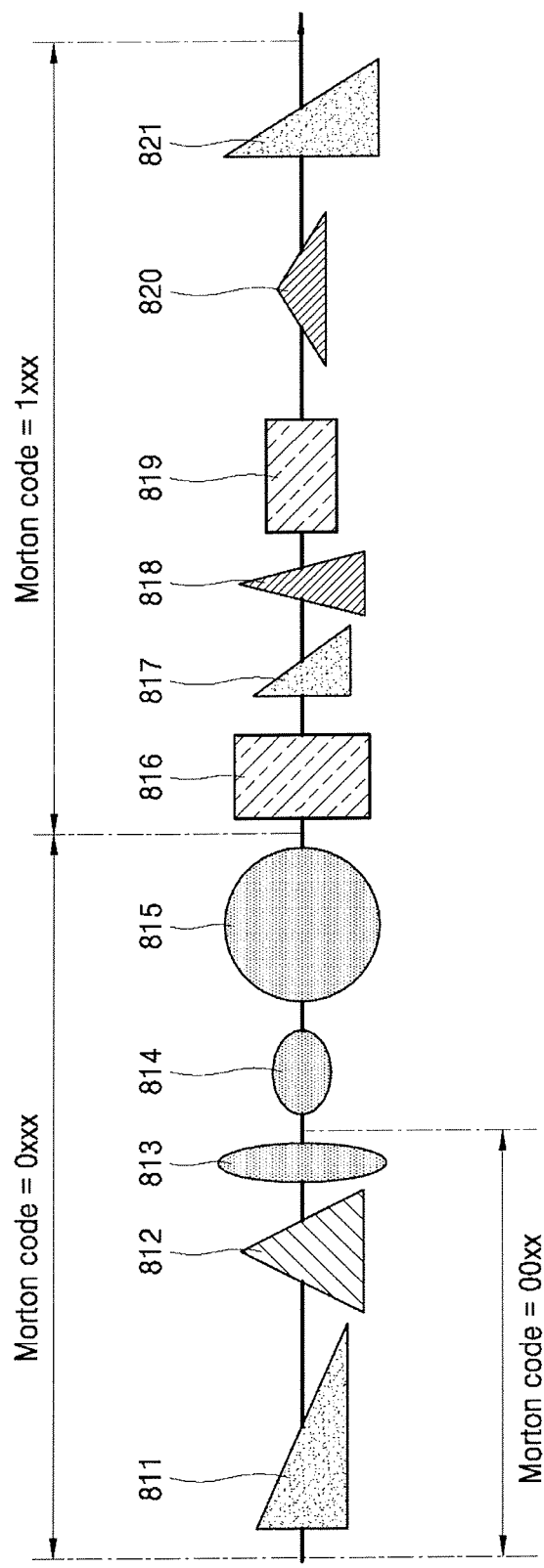
FIG. 11 is a diagram illustrating an example in which a processor determines candidate split points based on a Morton code, according to an embodiment of the inventive concept.

FIG. 11 is a diagram illustrating an example in which the processor 210 determines candidate split points based on a Morton code, according to an embodiment of the inventive concept.

In FIG. 11, there are 11 primitives shown including the first through eleventh primitives 811 through 821 that are aligned. It may be assumed in FIG. 11 that a bit value of a first digit of Morton codes of the first through fifth primitives 811 through 815 is '0' and a bit value of a first digit of Morton codes of the sixth through eleventh primitives 816 through 821 is '1'. Also, it may be assumed in FIG. 11 that a bit value of a second digit of Morton codes of the first through third primitives 811 through 813 is '0' and a bit value of a second digit of Morton codes of the fourth and fifth eleventh primitives 814 and 815 is '1'.

Initially, the processor 210 may determine a Morton code of the first primitive 811. The processor 210 may determine a Morton code of the second primitive 812, and may determine the Morton codes through primitive 815. The processor 210 may sequentially determine the Morton codes of the sixth through eleventh primitives 816 through 821.

The processor 210 may determine that the bit value ('1') of the second digit of the Morton code of the fourth primitive 814 is different from the bit value ('0') of the second digit of the Morton code of the third primitive 813. The processor 210 may store an index of the third primitive 813 and a digit (e.g. a second digit) having a changed bit value in the memory 220.

Thereafter, the processor 210 may determine that the bit value ('1') of the first digit of the Morton code of the sixth primitive 816 is different from the bit value ('0') of the first digit of the Morton code of the fifth primitive 815. The processor 210 may store an index of the fifth primitive 815 and a digit (e.g. a first digit) having a changed bit value in the memory 220.

As described with reference to FIG. 11, the processor 210 may store in a sequence of 'the third primitive 813->the fifth primitive 815' in the memory 220. However, the processor 210 may change an address of the memory 220 such that a reading sequence is 'the fifth primitive 815->third primitive 813'.

Figure 12:
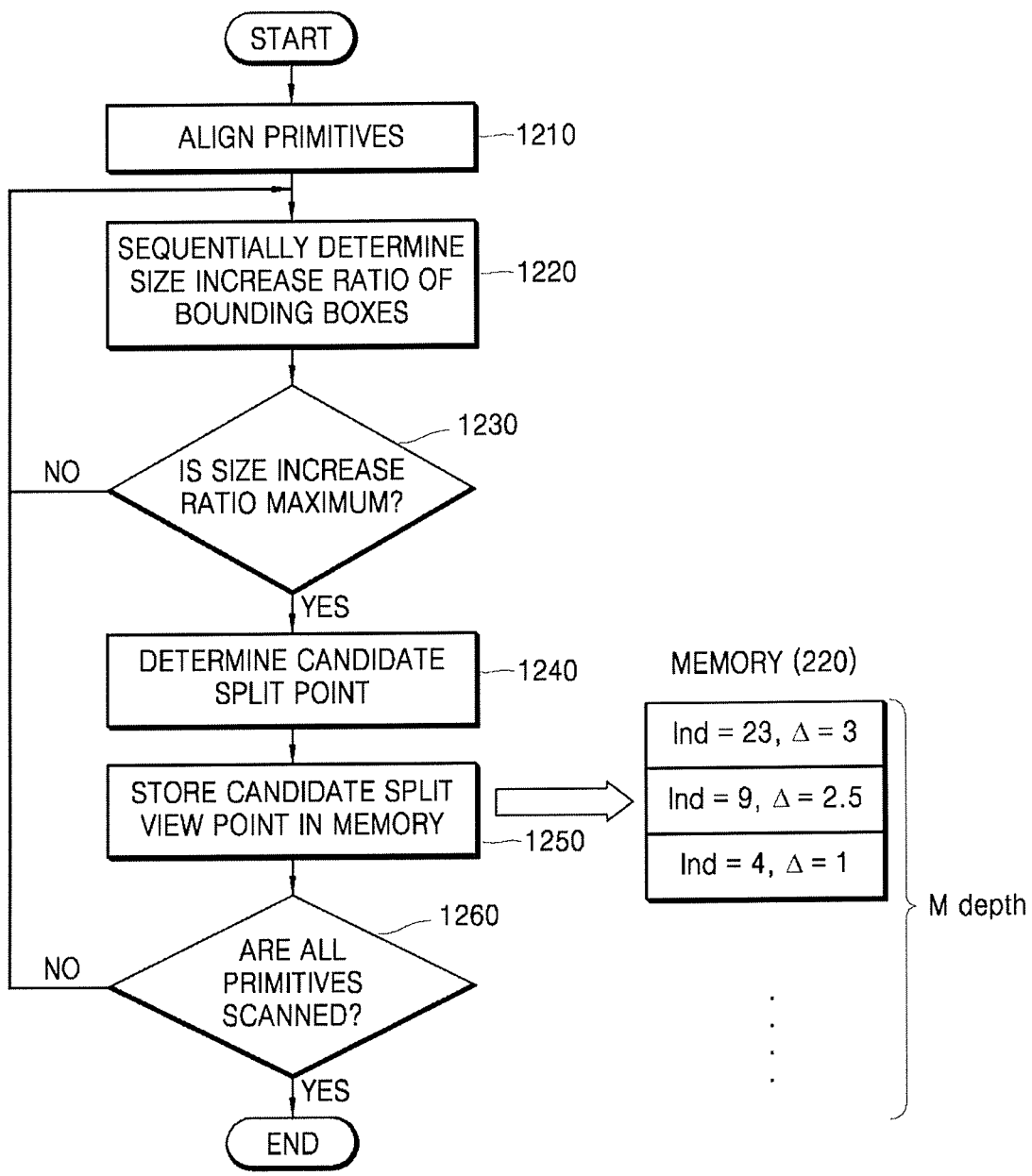
FIG. 12 is a flowchart illustrating another example in which a processor determines candidate split points and controls a memory, according to an embodiment of the inventive concept.

FIG. 12 is a flowchart illustrating another example in which the processor 210 determines candidate split points and controls the memory 220, according to an embodiment of the inventive concept.

In operation 1210, the processor 210 may align primitives. For example, the processor 210 may align the primitives based on Morton codes of the primitives. An example in which the processor 210 aligns the primitives is the same or similar to the description above with reference to FIGS. 8 and 9.

In operation 1220, the processor 210 may sequentially determine a size increase ratio of bounding boxes.

The processor 210 may respectively input the primitives to bounding boxes according to an alignment sequence. For example, the processor 210 may input a first primitive among the aligned primitives to a bounding box and additionally input a second bounding box aligned at a next sequence of the first primitive to the bounding box including the first primitive.

Also, the processor 210 may determine a size of a bounding box whenever each of the aligned primitives is input to the bounding box. For example, the processor 210 may determine a size of the bounding box to which the first primitive is input and a size of a bounding box in which the first primitive and a second primitive are input.

When the size of the bounding box is determined, the processor 210 may compare the size of the bounding box to which the first primitive is input and the size of the bounding box to which the first primitive and the second primitive are input. Based on a result of comparison, the processor 210 may determine a size increase ratio of the bounding boxes when the second primitive is input to the bounding box. The size increase ratio may be compared with the ratio of other bounding boxes in which more than one primitive is input.

In operation 1230, the processor 210 may determine whether the size increase ratio of the bounding boxes is the maximum. In other words, the processor 110 may determine whether a currently determined increase ratio is greater than a previously-determined increase ratio.

If the currently determined increase ratio is greater than the previously-determined increase ratio, operation 1240 may be performed. The currently determined increase ration is not greater than previously performed, operation 1020 may be performed to determine a size increase ratio of the next bounding boxes.

In operation 1240, the processor 210 may determine whether a candidate split point is based on a result of operation 1230. For example, the processor 210 may determine a last primitive included in the bounding box determined in operation 1230 as being the candidate split point.

In operation 1250, the processor 210 may store the candidate split point in the memory 220. For example, the processor 210 may store an index of a primitive corresponding to the candidate split point and a size increase ratio Δ of the bounding boxes in the memory 220.

When there is a plurality of candidate split points, the processor 210 may align and store the candidate split points in the memory 220 to determine a sequence of reading the candidate split points in the memory 220.

For example, the processor 210 may align and store the candidate split points in a sequence of the size increase ratio Δ of the bounding boxes (e.g. as determined in operation 1220). For example, it may be assumed that the size increase ratio Δ of a bounding box including a $4^{th}$ primitive is 1, the size increase ratio Δ of a bounding box including a $9^{th}$ primitive is 2.5, and the size increase ratio Δ of a bounding box including a $23^{rd}$ primitive is 3. In this case, the processor 210 may determine the candidate split points in a sequence of 'the 4th primitive->the $9^{th}$ primitive->the $23^{rd}$ primitive'. However, the processor 210 may store an index and the size increase ratio Δ of the bounding box in a sequence of 'the $23^{rd}$ primitive->the $9^{th}$ primitive->the $4^{th}$ primitive' in the memory 220.

The processor 210 may previously determine a tree depth and store the candidate split points for as many as the number M determined according to the tree depth in the memory 220.

In operation 1260, the processor 210 may determine whether all the primitives are scanned. In other words, the processor 210 may determine if a size of a bounding box including a last primitive among the aligned primitives is determined. If all the primitives are scanned, a process may end. If all the primitives have not been scanned, operation 1220 may be performed to determine the size increase ratio Δ of a next bounding box.

An example in which the processor 210 determines a size increase ratio of bounding boxes will be described with reference to FIG. 13 below.

Figure 13:
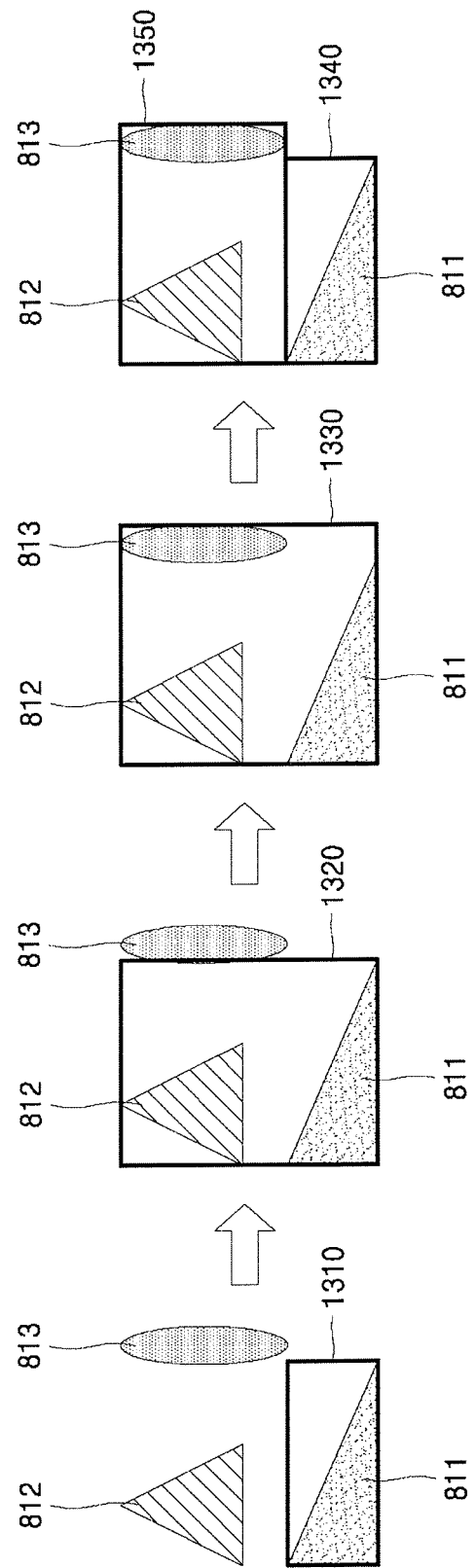
FIG. 13 is a diagram illustrating an example in which a processor determines a size increase ratio of bounding boxes, according to an embodiment of the inventive concept.

FIG. 13 is a diagram illustrating an example in which the processor 210 determines a size increase ratio of bounding boxes 1310 through 1340, according to an embodiment of the inventive concept.

In FIG. 13, for convenience of description, only the first through third primitives 811 through 813 from among the plurality of primitives 811 through 821 aligned according to Morton codes of FIG. 9 are illustrated.

The processor 210 may determine a size of the bounding box 1310 including the first primitive 811 at a first location among the aligned primitives 811 through 813. Also, the processor 210 may input the second primitive 812 aligned at a next sequence of the first primitive 811 to the bounding box 1310 including the first primitive 811. The processor 210 may compare a size of the bounding box 1320 including the first primitive 811 and the second primitive 812 and a size of the bounding box 1310 including the first primitive 811 to determine a size increase ratio of the bounding box 1320 with respect to the second primitive 812.

With continued reference to FIG. 13, the processor 210 may input the third primitive 813 to the bounding box 1320 including the first primitive 811 and the second primitive 812. The acceleration structure generator 200 may compare the bounding box 1330 including the first primitive 811, the second primitive 812, and the third primitive 813 and the bounding box 1320 including the first primitive 811 and the second primitive 812 to determine a size increase ratio of the bounding box 1330 with respect to the third primitive 813.

The processor 210 may input a primitive to a bounding box with respect to each of the primitives 814 through 821 among the aligned primitives 811 through 821 and repeatedly perform a process of determining a size increase ratio of the bounding box after each input of another one of the primitives.

Referring back to FIG. 7, in operation 740, the processor 210 may generate an acceleration structure by sequentially reading from memory the stored candidate split points.

For example, the processor 210 may generate the acceleration structure by generating a plurality of nodes with respect to the candidate split points stored in the memory 220. As described with reference to FIGS. 10 through 13, a plurality of candidate split points may be aligned according to a predetermined rule and stored in the memory 220. The processor 210 may sequentially read the plurality of candidate split points stored in the memory 220 to sequentially generate an upper node (a parent node) of the acceleration structure and a lower node (a child node) thereof.

An example in which the processor 210 generates an acceleration structure will be described with reference to FIGS. 14 and 15 below.

Figure 14:
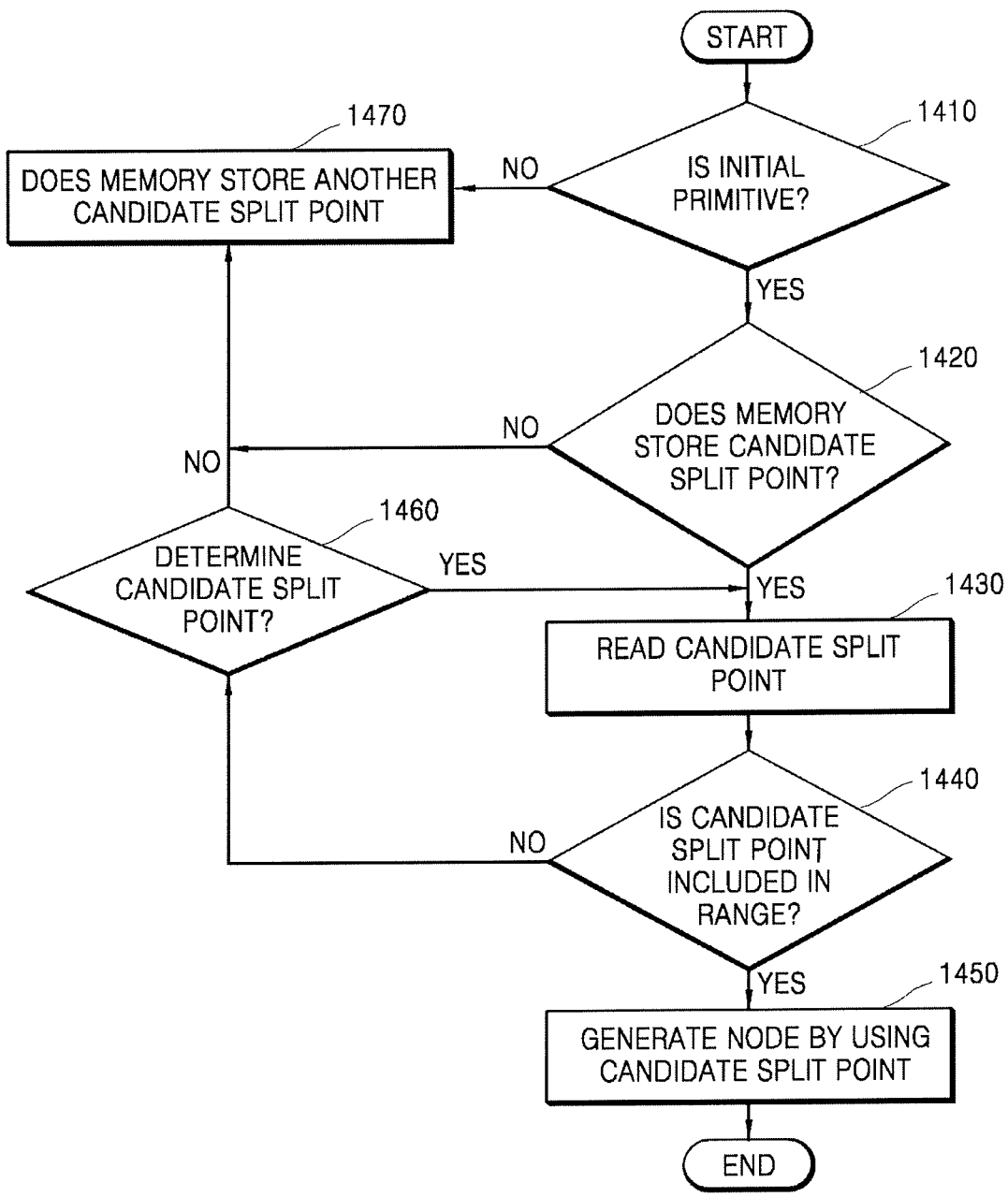
FIG. 14 is a flowchart illustrating an example in which a processor generates an acceleration structure, according to an embodiment of the inventive concept.

FIG. 14 is a flowchart illustrating an example in which the processor 210 generates an acceleration structure, according to an embodiment of the inventive concept.

In operation 1410, the processor 210 may start a process of generating the acceleration structure at an initial primitive. For example, the initial primitive may be a primitive (the first primitive 811 of FIG. 9) at a leftmost location among aligned primitives.

If the processor 210 does not completely scan the aligned primitives, then at operation (1470), the processor 210 may continuously scan the aligned primitives to determine candidate split points.

In operation 1420, the processor 210 may determine whether the memory 220 stores a candidate split point. If the memory 220 does not store the candidate split point, it may be interpreted that the processor 210 does not completely scan the aligned primitives. Thus, in operation 1470, the processor 210 may continue to scan the aligned primitives to determine the candidate split points.

In operation 1430, the processor 210 may read a candidate split point from the memory 220. For example, the processor 210 may sequentially read the candidate split points stored in the memory 220 according to a reading sequence.

In operation 1440, the processor 210 may determine whether the read candidate split point is within a range. In this regard, the range may refer to an appropriate range (e.g. a primitive range) for the read candidate split point to generate a node.

For example, assuming that the read candidate split point is a $5^{th}$ primitive, and the processor 210 generates a node from a first primitive to a $10^{th}$ primitive, the read candidate split point may be included in the range. However, assuming that the read candidate split point is the $5^{th}$ primitive, and the processor 210 generates a node from the 10th primitive to a $20^{th}$ primitive, the read candidate split point may not be included in the range.

When it is determined at operation 1440 that the read candidate split point is not included in the range, then at operation 1460 the processor 210 may determine whether the memory 220 stores another candidate split point. If the memory 220 stores another candidate split point, the processor 210 may read the candidate split point stored in the memory 220 (operation 1430). If the memory 220 does not store another candidate split point, then at operation 1470 the processor 210 may scan the aligned primitives to determine the candidate split points.

In operation 1450, the processor 210 may generate a node by using the candidate split point. For example, the processor 210 may generate the node by using a bounding box including a primitive corresponding to the candidate split point.

An example in which the processor 210 generates an acceleration structure will be described with reference to FIG. 15 below.

Figure 15:
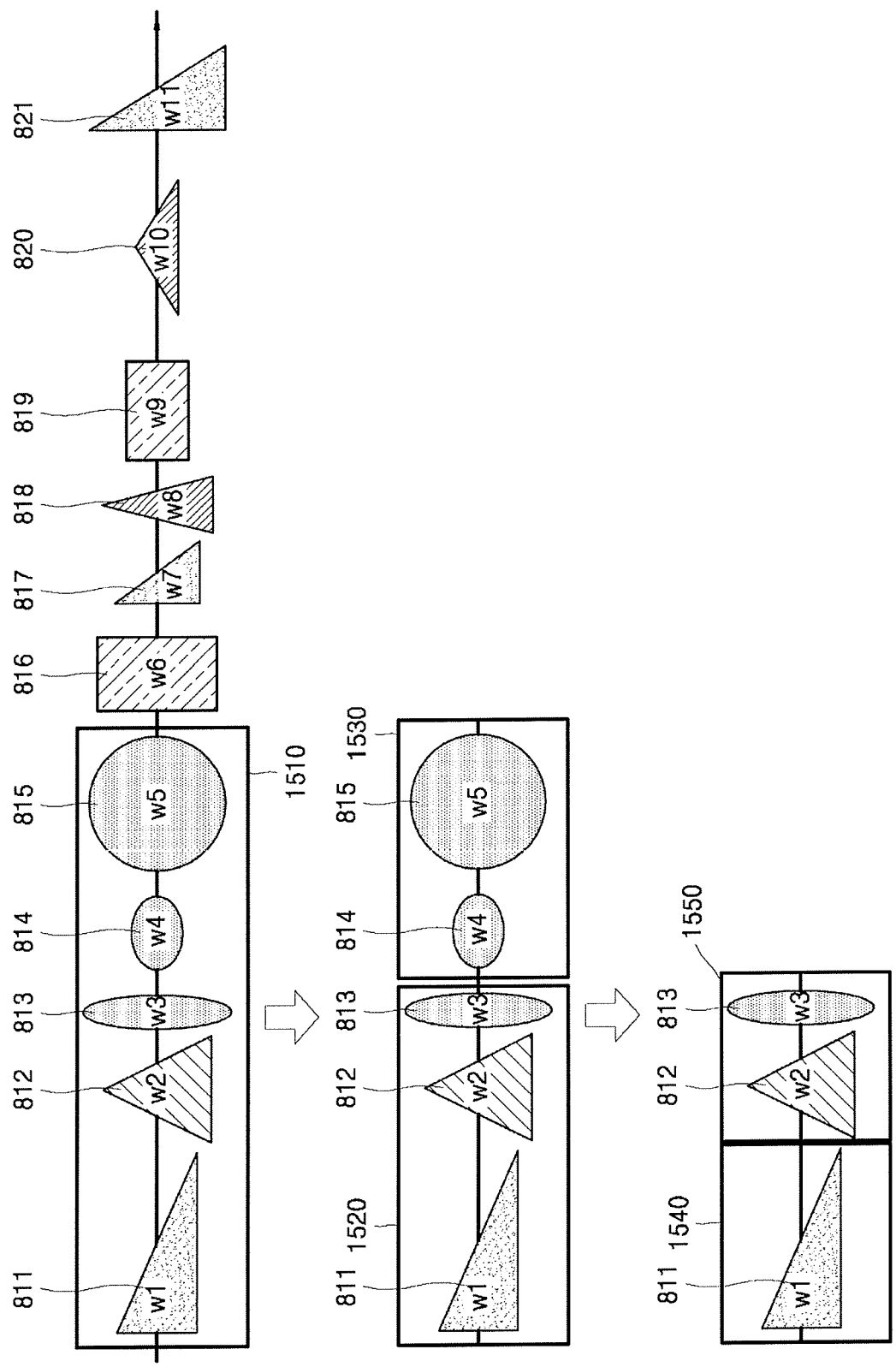
FIG. 15 is a diagram illustrating an example in which a processor generates an acceleration structure by using a candidate split point, according to an embodiment of the inventive concept.

FIG. 15 is a diagram illustrating an example in which the processor 210 generates an acceleration structure by using a candidate split point, according to an embodiment of the inventive concept.

The processor 210 may sequentially read candidate split points stored in the memory 220. For example, it may be assumed that the candidate split points may be stored in a sequence of 'the 5th primitive 815->the $3^{rd}$ primitive 813->the first primitive 811 in the memory 220.

With reference to FIG. 15, the processor 210 may generate a first bounding box 1510 by using the 5th primitive 815. Specifically, the processor 210 may generate the first bounding box 1510 including the first through fifth primitives 811 through 815. In this regard, the first bounding box 1510 may correspond to a first node.

Thereafter, the processor 210 may generate a second bounding box 1520 by using the third primitive 813. The processor 210 may generate a third bounding box 1530 by using the primitives 814 and 815 that are included in the first bounding box 1510 but are not included in the second bounding box 1520. In this regard, a second node corresponding to the second bounding box 1520 and a third node corresponding to the third bounding box 1530 may be child nodes of the first node.

Thereafter, the processor 210 may generate a fourth bounding box 1540 by using the first primitive 811. The processor 210 may generate a fifth bounding box 1550 by using the primitives 812 and 813 that are included in the third bounding box 1530 but are not included in the fourth bounding box 1540. In this regard, a fourth node corresponding to the fourth bounding box 1540 and a fifth node corresponding to the fifth bounding box 1550 may be child nodes of the second node.

According to the above-described method, the processor 210 may generate at least one node corresponding to the $6^{th}$ through $11^{th}$ primitives 816 through 821. Then, the processor 210 may generate the acceleration structure by using the generated at least one node corresponding to the $6^{th}$ through $11^{th}$ primitives 816 through 821.

Figure 16:
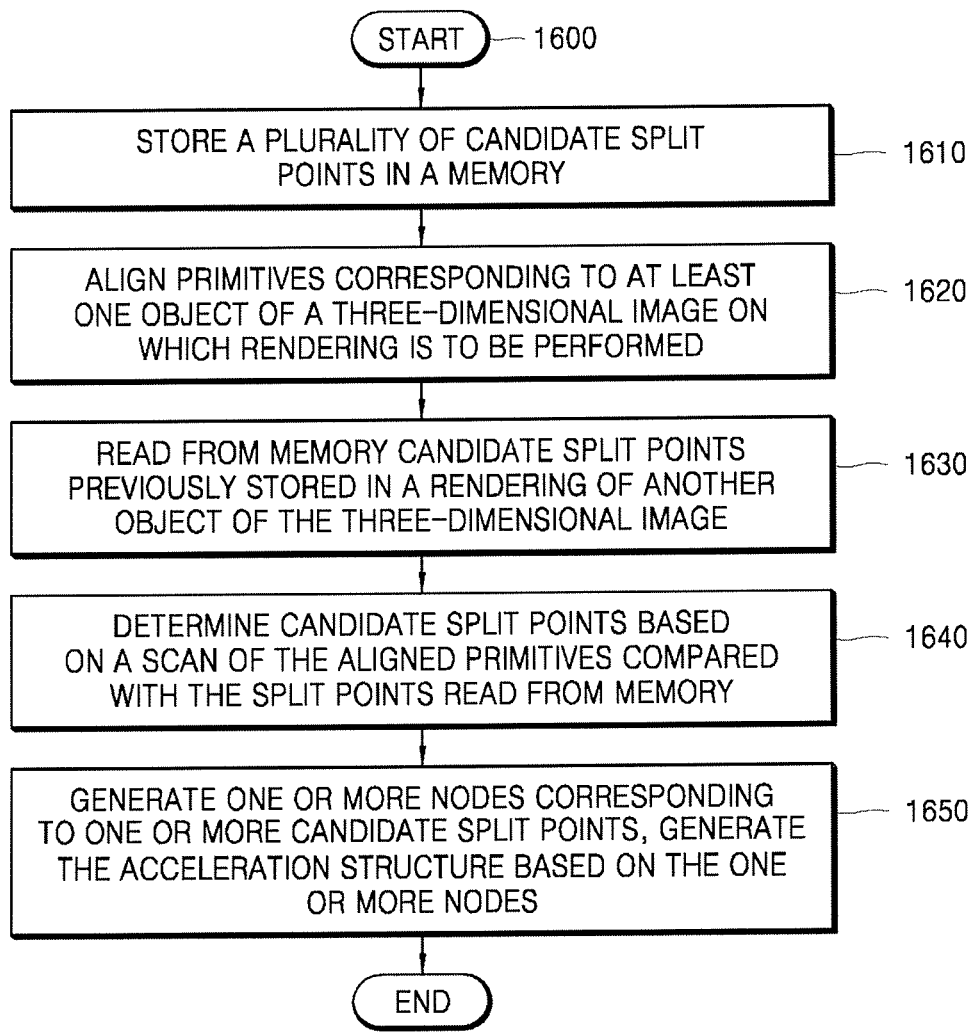
FIG. 16 is a flowchart illustrating operation of an acceleration structure apparatus according to an embodiment of the inventive concept.

FIG. 16 is a flowchart illustrating operation of an apparatus for generating an acceleration structure according to an embodiment of the inventive concept.

With reference to FIG. 16, at operation 1610, a plurality of candidate points are stored in a memory. A person of ordinary skill in the art should understand and appreciate that the candidate points may be based on a current rendering of an object of an image, or may be stored during a previous rendering of another object of the image, and may be basis to perform generation of an acceleration structure of a current object.

At operation 1620, a processor may align the primitives corresponding to at least one object of a three-dimensional image on which rendering is to be performed.

At operation 1630, candidate split points previously stored in a rendering of another object of the three-dimensional image may be read.

At operation 1640, candidate split points may be determined based on a scan of the aligned primitives compared with the split points read from memory.

At operation 1650, one or more nodes corresponding to one or more candidate split point are generated. The acceleration structure is then generated based on the one or more nodes. For example, if there are two nodes, one node may be an upper node of the acceleration structure, and the other node may be a lower node of the acceleration structure.

As described above, the acceleration structure generator 200 may align primitives corresponding to at least one object, determine candidate split points by using the aligned primitives, and generate the acceleration structure by using the candidate split points, thereby reducing computation and power consumption that are used to generate the acceleration structure. The embodiments described above may be implemented as an executable program, and may be executed by a general-purpose digital computer that runs the program by using a computer-readable recording medium. The loading of the executable program into a general-purpose computer transforms the general purpose computer into a special purpose computer.

While at least one embodiment of the inventive concept was explained with the use of Morton codes, a person of ordinary skill in the art should appreciate that the inventive concept is not limited to using Morton codes.

Also, a data structure as may be used in the embodiments described above may be recorded by using various units on a computer-readable medium. Examples of the non-transitory computer-readable medium include storage media such as magnetic storage media (e.g., read only memories (ROMs), floppy discs, or hard discs), optically readable media (e.g., compact disk-read only memories (CD-ROMs), or digital versatile disks (DVDs)), etc. but are not limited thereto. The term "unit" as referred to herein is to be understood as including hardware components arranged in a circuit or integrated circuit and may include software.

It should be understood that embodiments described herein should be considered in a descriptive sense only and not for purposes of limitation. Descriptions of each embodiment of the inventive concept should typically be considered as available for other embodiments unless specified otherwise.

While one or more embodiments of the inventive concept have been described with reference to the figures, it will be understood by a person of ordinary skill in the art that various changes in form and details may be made therein without departing from the spirit and scope as defined by the following claims.

What is claimed is:

1. A method of generating an acceleration structure for ray tracing, the method comprising:
    aligning primitives corresponding to at least one object on which rendering is to be performed;
    generating a bounding box when the aligned primitives are sequentially input;
    determining candidate split points based on comprising a ratio of one bounding box with a ratio of another bounding box;
    storing the candidate split points according to a predetermined rule;
    reading the stored candidate split points including at least one candidate split point from a previous rendering and generating at least one node corresponding to one of the candidate split points; and
    generating the acceleration structure by using the generated at least one node.

2. The method of claim 1, wherein the candidate split points are stored in an internal memory of a graphics processing unit (GPU).

3. The method of claim 1, wherein the stored candidate split points are sequentially read, and generating the at least one node comprises sequentially generating an upper node and a lower node of the acceleration structure.

4. The method of claim 1, wherein the aligning of the primitives comprises:
    generating a Morton code indicating a respective location of each of the primitives; and
    aligning the primitives based on a value of the Morton code for each of the primitives.

5. The method of claim 4, wherein the location of each of the primitives comprises coordinate information of a center of each of the primitives in a three-dimensional (3D) space.

6. The method of claim 1, wherein the determining of the candidate split points comprises: determining the candidate split points by scanning the primitives in a direction in which a respective value of one of a plurality of Morton codes corresponding to each primitive increases.

7. The method of claim 1, wherein the determining of the candidate split points comprises: determining the candidate split points by scanning the primitives in a direction in which a respective value of one of a plurality of Morton codes corresponding to each primitive decreases.

8. The method of claim 1, wherein the storing of the candidate split points comprises: determining the candidate split points based on a respective value of a plurality of Morton codes corresponding to each of the candidate split points, or determining a size increase ratio of bounding boxes corresponding to the candidate split points.

9. The method of claim 1, wherein the generating the acceleration structure by generating at least one node comprises generating a plurality of nodes with respect to the stored candidate split points.

10. An apparatus for generating an acceleration structure for ray tracing, the apparatus comprising:
a memory configured to store candidate split points; and
a processor configured to align primitives corresponding to at least one object on which rendering is to be performed, determine the candidate split points by scanning the aligned primitives, control the memory to store the candidate split points according to a predetermined rule, and generate the acceleration structure based on a sequential reading of the candidate split points from the memory and generate at least one node corresponding to the sequentially read candidate split points, wherein the processor is further configured to generate a bounding box when the aligned primitives are sequentially input and determine the candidate split points based on comparing a ratio of one bounding box with a ratio of another bounding box.

11. The apparatus of claim 10, wherein the processor is further configured to generate a Morton code indicating a location of each of the primitives and align the primitives based on a respective value of the Morton code.

12. The apparatus of claim 11, wherein the location of each of the primitives comprises coordinate information of a center of each of the primitives in a three-dimensional space.

13. The apparatus of claim 10, wherein the processor is further configured to determine the candidate split points by scanning the primitives in a direction in which a respective value of one of a plurality of Morton codes corresponding to each primitive increases.

14. The apparatus of claim 10, wherein the processor is further configured to determine the candidate split points by scanning the primitives in a direction in which a respective value of one of a plurality of Morton codes corresponding to each primitive decreases.

15. The apparatus of claim 10, wherein the processor is further configured to control the memory to store the candidate split points based on a respective value of a plurality of Morton codes each corresponding to one of the candidate split points or a size increase ratio of bounding boxes corresponding to the candidate split points.

16. An apparatus for generating an acceleration structure for ray tracing, the apparatus comprising:
a memory configured to store a plurality of candidate split points;
an acceleration structure generator connected to the memory, the acceleration structure includes at least one processor configured to align primitives corresponding to at least one object of a three-dimensional image on which rendering is to be performed, generate a bounding box when the aligned primitives are sequentially input, determine the candidate split points based on comparing a ratio of one bounding box with a ratio of another bounding box, control the memory to store the candidate split points according to a predetermined rule, and read the candidate split points from the memory and generate one or more nodes corresponding to one or more candidate split points, and generate the acceleration structure based on the one or more nodes; and
wherein the candidate split points used to generate the acceleration structure were previously stored in a rendering of another object of the three-dimensional image.

17. The apparatus according to claim 16, wherein the acceleration structure comprises a K-dimensional (KD) tree.

* * * * *